United States Patent
Tojo

(10) Patent No.: US 6,965,701 B2
(45) Date of Patent: Nov. 15, 2005

(54) MOVING IMAGE DATA MANAGEMENT APPARATUS AND METHOD

(75) Inventor: Hiroshi Tojo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/845,198

(22) Filed: May 14, 2004

(65) Prior Publication Data

US 2004/0268223 A1 Dec. 30, 2004

Related U.S. Application Data

(63) Continuation of application No. PCT/JP02/12921, filed on Dec. 10, 2002.

(30) Foreign Application Priority Data

Dec. 28, 2001 (JP) ........................ 2001-401351

(51) Int. Cl.[7] .............................................. G06K 9/36
(52) U.S. Cl. ..................................................... 382/239
(58) Field of Search ................................. 382/232, 236, 382/240, 243; 348/220.1, 401.1, 409.1–416.1, 431.1; 375/240.23, 240.25, 240.26; 386/4, 46, 52, 120; 345/630, 474, 475; 355/40; 715/721, 723, 835, 838

(56) References Cited

U.S. PATENT DOCUMENTS

| | | | | |
|---|---|---|---|---|
| 5,953,008 A | * | 9/1999 | Hagiuda | 345/630 |
| 5,963,204 A | * | 10/1999 | Ikeda et al. | 715/723 |
| 6,052,492 A | * | 4/2000 | Bruckhaus | 382/284 |
| 6,332,003 B1 | * | 12/2001 | Matsuura et al. | 375/240.23 |
| 6,408,301 B1 | * | 6/2002 | Patton et al. | 707/102 |
| 6,424,795 B1 | * | 7/2002 | Takahashi et al. | 386/120 |
| 6,697,563 B1 | * | 2/2004 | Komoda et al. | 386/46 |
| 6,704,029 B1 | * | 3/2004 | Ikeda et al. | 715/723 |
| 6,718,231 B2 | * | 4/2004 | Konno et al. | 700/245 |
| 6,734,859 B2 | * | 5/2004 | Hayashi et al. | 345/475 |
| 6,747,674 B1 | * | 6/2004 | Asami | 715/721 |
| 2002/0047936 A1 | | 4/2002 | Tojo | 348/700 |
| 2002/0122212 A1 | | 9/2002 | Tojo | 358/453 |
| 2003/0043279 A1 | | 3/2003 | Alardin | 348/211.3 |

FOREIGN PATENT DOCUMENTS

| | | |
|---|---|---|
| JP | 62-74156 | 4/1987 |
| JP | 03-081304 | 4/1991 |

(Continued)

OTHER PUBLICATIONS

Notification of PCT International Search Report dated Jan. 21, 2003 (International Application No. PCT/JP02/12921).

Notification of PCT International Preliminary Examination dated Jul. 22, 2003 (International Application No. PCT/JP02/12921).

*Primary Examiner*—Jose L. Couso
(74) *Attorney, Agent, or Firm*—Fitzpatrick, Cella, Harper & Scinto

(57) ABSTRACT

A moving image data management apparatus which manages one or plural representative images in correspondence with a moving image recorded on a storage medium. The apparatus generates a thumbnail based on a frame imaged selected in a desired selection base in an arbitrary section designated in the moving image, in correspondence with the section, and records the thumbnail. The corresponding thumbnail is stored in correspondence with section information indicating the designated section, position information indicating the position of the selected frame image, and Type ID indicating the selection base. Among the registered thumbnails, a thumbnail is selected by referring to the Type IDs in correspondence with a processing purpose and is presented to a user. As the selection base which is information on generation of thumbnail is held as an attribute of the thumbnail, and a thumbnail appropriate to processing can be presented, to improve operability in processing using thumbnail.

12 Claims, 13 Drawing Sheets

FOREIGN PATENT DOCUMENTS

| | | |
|---|---|---|
| JP | 03081304 | 4/1991 |
| JP | 03081304 | 9/1991 |
| JP | 8-249348 | 9/1996 |
| JP | 9-219835 | 8/1997 |
| JP | 10-112835 | 4/1998 |
| JP | 11-176137 | 7/1999 |
| JP | 11-259507 | 9/1999 |
| JP | 2000-322875 | 11/2000 |
| JP | 2001-306619 | 11/2001 |
| JP | 2002-007478 | 1/2002 |
| JP | 2002-335473 | 11/2002 |

* cited by examiner

FIG. 5

| Length (Bytes) | Contents |
|---|---|
| 6 | Start Point |
| 6 | End Point |
| 2 | Thumbnail Type ID |
| 4 | Thumbnail Offset |

| Length (Bytes) | Contents |
| --- | --- |
| 2 | Thumbnail Imege Size |
| 6 | Thumbnail Key Relative Point |
| 4 | Thumbnail Image Offset |

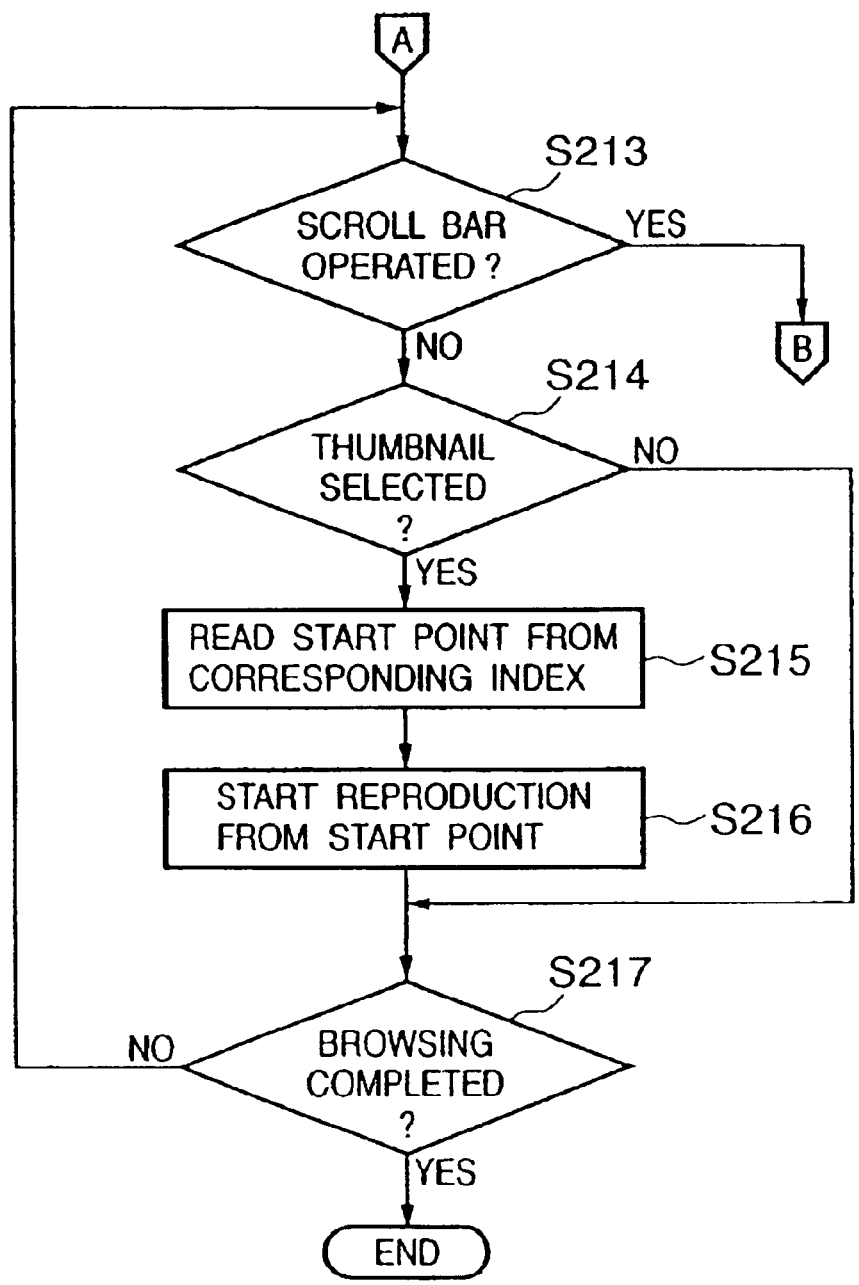

MOVING IMAGE DATA MANAGEMENT APPARATUS AND METHOD

The present application is a continuation application of PCT International Application No. PCT/JP02/12921 filed Dec. 10, 2002 (filed in English in the Japanese Receiving Office).

FIELD OF THE INVENTION

The present invention relates to moving image data management apparatus and method for management of moving image data recorded on a storage medium by one or plural representative images.

BACKGROUND OF THE INVENTION

Conventionally, a method of managing moving images recorded on a storage medium by using representative images has been proposed. Japanese Patent No. 03081304 discloses using representative images in general moving/still image reproduction apparatus, and especially discloses using representative images for simplified display upon selection of still or moving image. Further, Japanese Published Unexamined Patent Application Nos. Hei 11-176137 and 2000-322875 disclose assigning a representative image to a moving image section, and selecting a section as a target of reproduction designation by using the representative image.

As such representative image is generally used, the variety of usage of the representative image increases. For example, image management using the representative images can be applied to an editing apparatus as well as the above-described reproduction apparatus.

However, even regarding the same section in a moving image, a representative image appropriate to a user interface upon reproduction, and a representative image appropriate to a user interface upon editing, are different from each other. Accordingly, if the same representative image is to be used in various apparatuses including an editing apparatus, the following problem occurs.

For example, in FIG. 1, reference numeral 11 denotes a moving image. In this moving image 11, in a section (a), the motion of a batter who holds a bat at the ready and hits a ball is recorded. Numerals 12 and 13 denote representative images regarding the same section (a). The representative image 12, generated from a head frame of the section (a), is an image of the batter at the ready. The representative image 13, generated from a middle frame of the section, which is an image of the batter when he hits the ball. The representative image 13 can be a most appropriate representative image to indicate the content of the section (a).

Generally, one representative image is assigned to one section and is registered. Accordingly, one of the representative images 12 and 13 is actually registered as a representative image of the section (a). The registered representative image can be used as an index image for e.g. a reproduction apparatus. However, if the representative image 13 is registered, upon selection of representative image in the reproduction apparatus, reproduction starts from a status prior to the hit (the reproduction starts from the head of the section (a)), thus a user feels unnatural. On the other hand, if the representative image 12 is registered, when the image is used in an editing apparatus, it is inconvenient that the content of the section (a) cannot be precisely grasped by the image 12. That is, in the example of FIG. 1, it cannot be determined from the representative image 12 whether the section (a) indicates a scene where the batter hits the ball or a scene where the batter swings at the ball and misses. In this manner, an appropriate representative image in one section of moving image depends on the purpose of apparatus to be used.

Conventionally, assignment and management of representative images are necessary in accordance with purpose and usage of moving image data such as reproduction and editing. Accordingly, information on the representative images are redundantly held by purpose such as editing or reproduction, by moving image or still image, or by apparatus or usage. Further, program code for processing to utilize the information on the representative images must be respectively held for the representative images. That is, when the representative images are used in various moving image data processing, the information on the representative images are respectively managed by apparatus or program. Accordingly, it is wasteful to have plural apparatuses and programs for management, and it is further wasteful to independently store the representative image data. To maintain operability in moving image data processing upon use of representative image, management of representative images becomes complicated.

SUMMARY OF THE INVENTION

The present invention has been made in consideration of the above problem, and has its object to improve operability of various moving image data processing using representative images and to simplifying management of the representative images by adding information regarding selection of frame as an original of the representative image as an attribute of the representative image to the representative image.

According to the present invention, the foregoing object is attained by providing an apparatus for managing one or plural representative images in correspondence with a moving image, comprising means for storing a representative image, generated based on a frame image selected from the moving image, in correspondence with the moving image; and means for storing section information indicating a section in the moving image and attribute information indicating a selection base of the frame image, in correspondence with the representative image.

According to another aspect of the present invention, the foregoing object is attained by providing a method for managing one or plural representative images in correspondence with a moving image, comprising a step of storing a representative image, generated based on a frame image selected from the moving image, in correspondence with the moving image; and a step of storing section information indicating a section in the moving image and attribute information indicating a selection base of the frame image, in correspondence with the representative image.

Other features and advantages of the present invention will be apparent from the following description taken in conjunction with the accompanying drawings, in which like reference characters designate the same name or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a table showing an example of data structure for one index in an index area 406 in a footer 403 in FIG. 4;

FIGS. 9A and 9B are flowcharts showing processing upon browser operation in the moving image processing apparatus;

DETAILED DESCRIPTION OF THE PREFERRED EMBODIMENTS

A preferred embodiment of the present invention will now be described in detail in accordance with the accompanying drawings.

In the present embodiment, in a method for utilizing representative images, to manage/utilize representative images and information related to the representative images in a simple manner, each representative image has information upon generation of the image. By using this information, representative images appropriate to respective processings are accessible for plural apparatuses and control methods, and a representative image to be utilized is selected in correspondence with purpose or the like. Note that the information upon generation of representative image means data indicating an image in a corresponding moving image section as an original of the representative image or the type of image (a dynamic motion or the like) in the corresponding moving image section. The information upon generation of representative image includes information regarding frame selection (selection base) as an original of the representative image.

According to the present embodiment, as information upon generation of representative image is provided, plural representative images can be recorded and held in a centralized manner, thus waste is avoided. (For example, plural representative images corresponding to plural types of purposes can be managed as one file). Further, as an appropriate representative image to realize a particular function in each apparatus or program can be selected by referring to selection bases of representative images, the operability of the function can be improved. Further, upon storage of information, the arrangement of the information or the like may be determined in correspondence with the purpose or method of the information regarding the representative image. That is, the locations of significant thumbnail (header), an index area (footer) on a storage medium can be arranged to easily-accessible positions in correspondence with significance.

Hereinbelow, a moving image processing apparatus according to the present embodiment will be described in detail.

Figure 1:
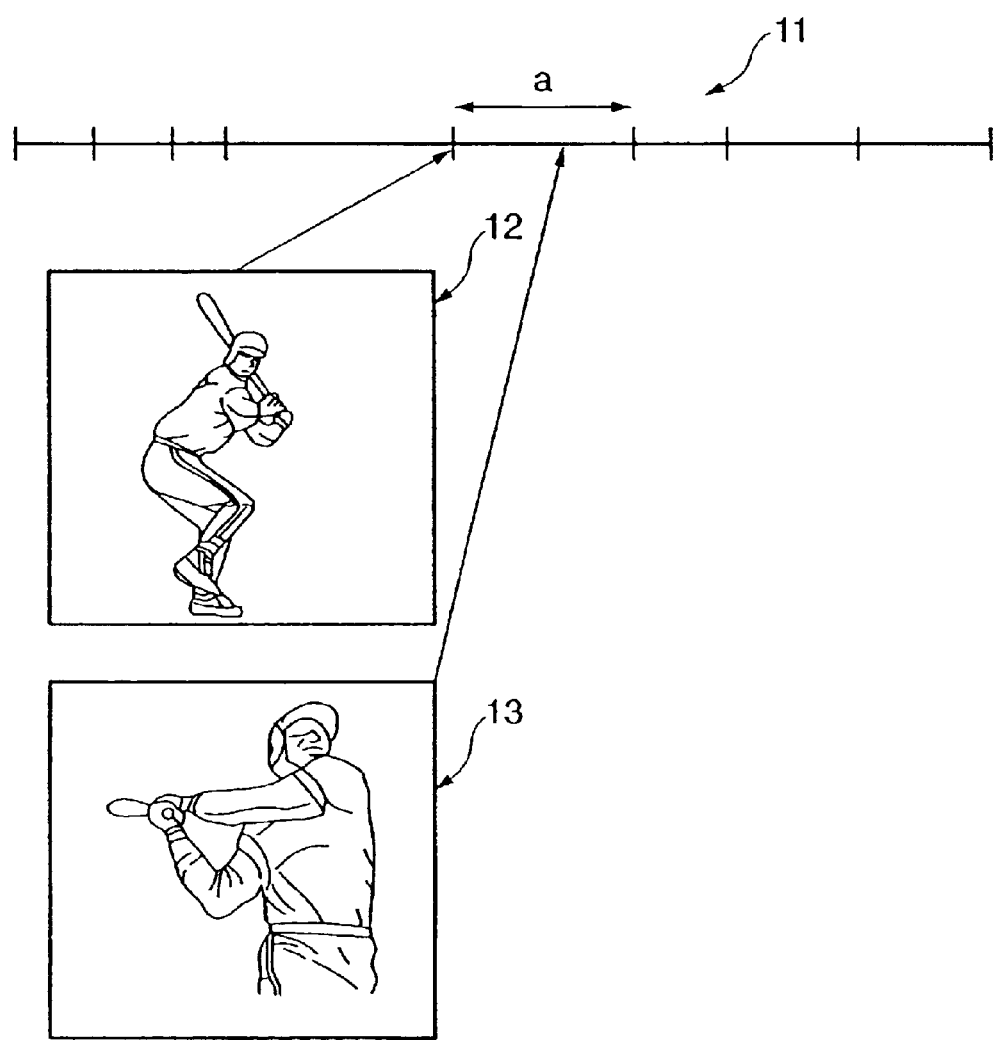
FIG. 1 is an explanatory view of problem in utilization of representative image.
Figure 2:
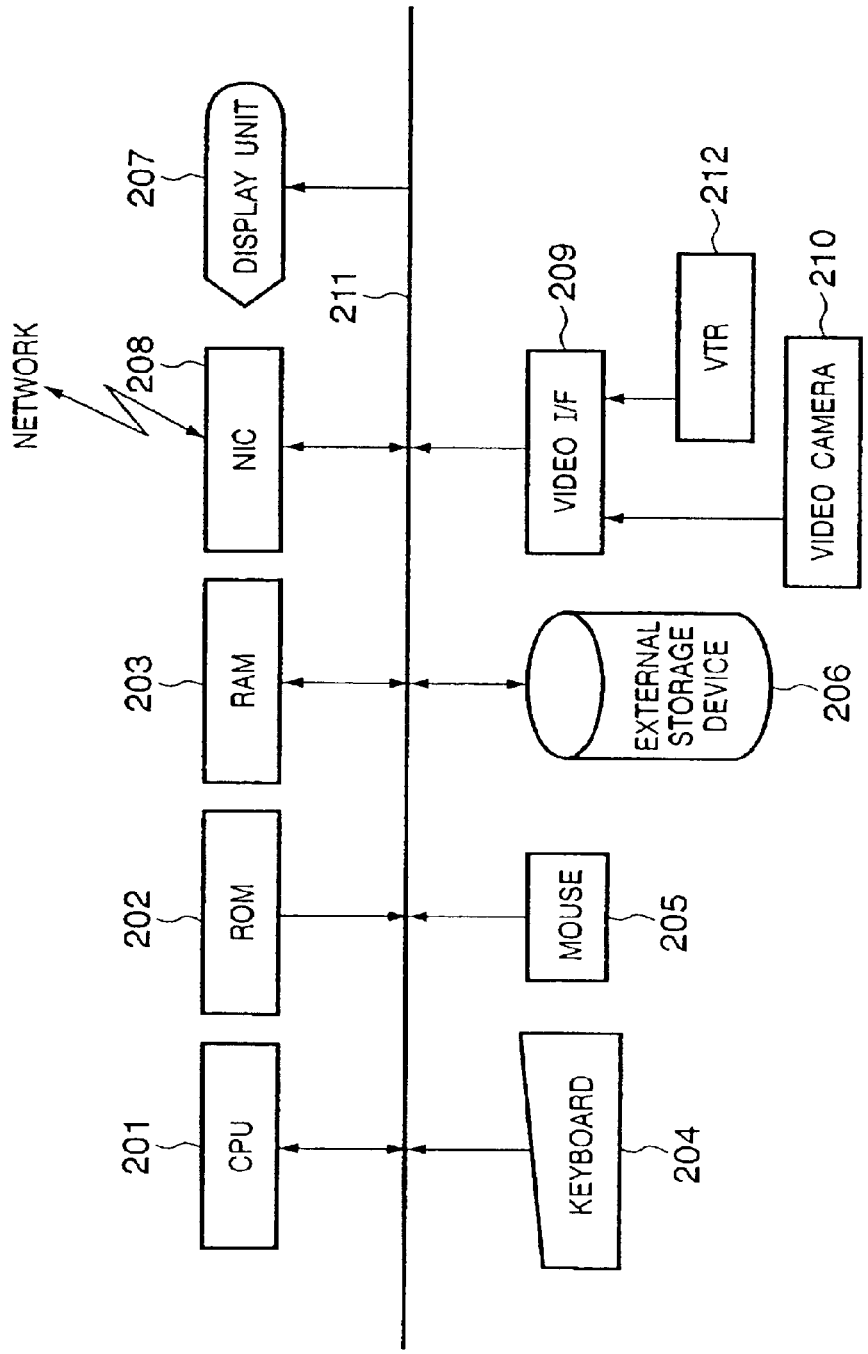
FIG. 2 is a block diagram showing a control construction of a moving image processing apparatus according to an embodiment.

FIG. 2 is a block diagram showing a control construction of the moving image processing apparatus according to the present embodiment. In FIG. 2, numeral 201 denotes a CPU which performs various controls in the moving image processing apparatus. Numeral 202 denotes a ROM in which a boot program executed upon boot-up of the apparatus and various data are stored. Numeral 203 denotes a RAM in which a control program for processing by the CPU 201 is stored, and which provides a work area for execution of various controls by the CPU 201. Numeral 204 denotes a keyboard, and 205, a mouse. The keyboard and the mouse provide an environment for user's various input operations.

Numeral 206 denotes an external storage device comprising a hard disk, a floppy disk, an optical disk, a magneto-optic disk, a magneto-optic tape, magnetic tape, a non-volatile semiconductor memory (e.g. a flash memory) or the like. Numeral 207 denotes a display unit comprising a display of CRT, LCD or the like which displays results of various processings and the like for a user. Numeral 208 denotes a network interface which enables communication with respective devices on a network. Numeral 209 denotes a video interface which reads a moving image from a video camera 210 and a VTR 212. Numeral 211 denotes a bus interconnecting the above respective elements.

Note that the video camera 210, the VTR 212 and the external storage device 206 may be substituted by devices arranged on the network.

Figure 3:
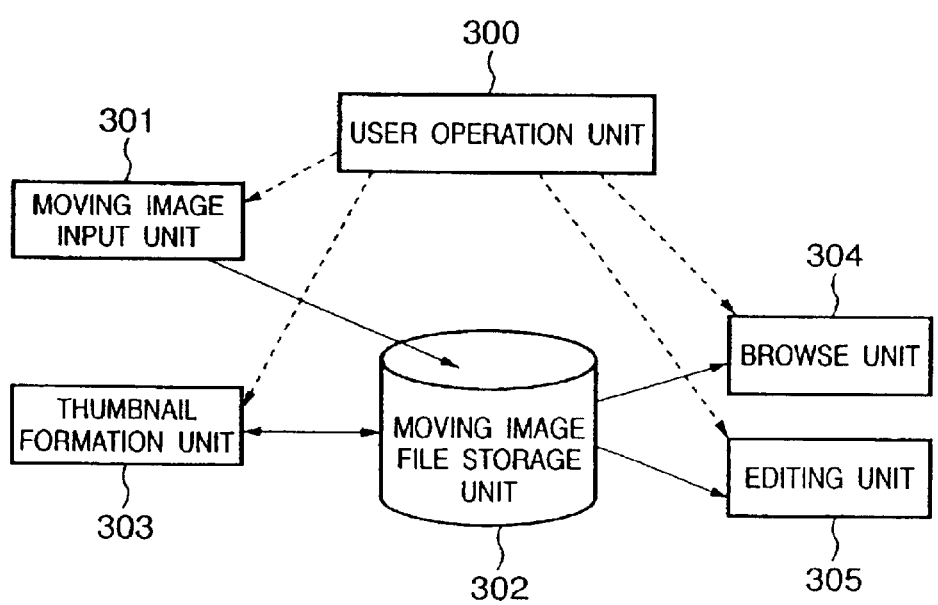
FIG. 3 is a block diagram showing a functional construction of the moving image processing apparatus according to the embodiment.

FIG. 3 is a block diagram showing a functional construction of the moving image processing apparatus according to the present embodiment. Numeral 300 denotes a user operation unit which obtains the user's designation or input via the keyboard 204, the mouse 205 and the like. Numeral 301 denotes a moving image input unit which reads a moving image from the video camera 210, the VTR 212 or the like via the video I/F 209, and inputs the image into the moving image processing apparatus. Numeral 302 denotes a moving image file storage unit comprising the external storage device 206, which holds moving images inputted by the moving image input unit 301 in file format.

Numeral 303 denotes a thumbnail generation unit which presents a moving image stored in the moving image file storage unit 302 on the display unit 207, such that the user designates a desired section and a frame image in the section. The thumbnail generation unit 303 generates a reduced image (hereinbelow, thumbnail image) based on the designated frame image, and stores it, as a moving image file, with information on the designated section or the like, into the moving image file storage unit 302. That is, by the thumbnail generation unit 303, the user can refer to the moving image presented on the display unit 207, and designate a section in the moving image and a frame representing the section via the user operation unit 300. Then the thumbnail image based on the designated frame image is inserted into the moving image file, with the information on the designated section or the like, and the file is stored into the moving image file storage unit 302. Note that the entire moving image may be designated as a section.

Numeral 304 denotes a browse unit which reads a thumbnail from the moving image file storage unit 302 and displays it via the display unit 207, and reproduces a moving image corresponding to the thumbnail selected by the user.

Upon reproduction of moving image in this case, only a section represented by the selected thumbnail is reproduced, or the section represented by the selected thumbnail and the subsequent moving image are reproduced. Numeral 305 denotes an editing unit which performs editing on a moving image held in the moving image file storage unit 302. Further, the progress and result of the editing are displayed via the display unit 207.

Note that the functions of the above-described respective elements are realized by execution of the control program stored in the ROM 202 by the CPU 201. Otherwise, it may be arranged such that the control program is appropriately loaded from the external storage device 206 onto the RAM 203 and executed by the CPU 201.

<1. Thumbnail Storage Method>

Figure 4:
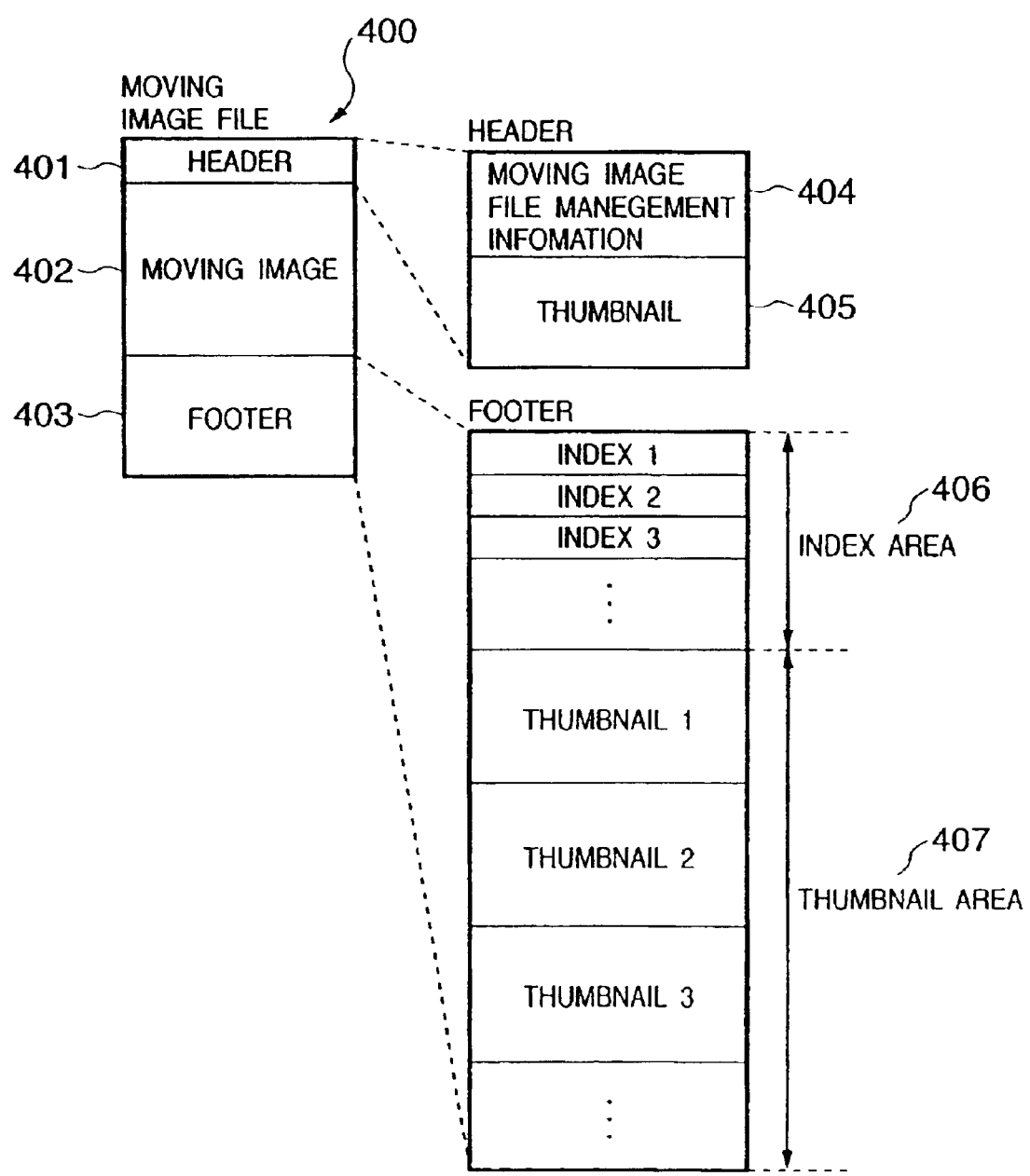
FIG. 4 is a schematic diagram showing an example of thumbnail storage status in a moving image file according to the embodiment.

FIG. 4 is a schematic diagram showing an example of thumbnail storage status in a moving image file according to the embodiment.

Numeral 400 denotes a moving image file stored on a storage medium by a moving image file storage unit 302. Note that the unit of storage is not limited to 1 moving image file, but the unit may be a shot from depression of recording button of the image sensing device to stoppage of image sensing, or may be 1 TV broadcast program. The moving image file 400 comprises a header 401 in which management information or the like is recorded, a moving image 402 in which moving image data itself is recorded, and a footer 403 in which mainly a thumbnail is recorded.

In the header 401, moving image file management information 404 on the data size, the format, the date of formation and the like of the moving image file, and 1 image of thumbnail 405 are recorded. The footer 403 has a thumbnail area 407 in which plural thumbnails can be recorded and an index area 406 in which index information on the respective thumbnails are recorded.

FIG. 5 is a table showing an example of data structure for 1 index in the index area 406 in the footer 403 in FIG. 4.

"Start Point" and "End Point" are start point and end point of a section in a moving image represented by the thumbnail. The form of the start point and the end point is not particularly limited as long as the points specify the section in the moving image, however, it is preferable that the points are described in time code or frame ID. Note that in a case where the entire moving image is designated as a section, the Start Point indicates a head frame of the moving image, and the End Point, an end frame of the moving image.

In "Thumbnail Type ID", an ID is determined by image selection base upon generation of thumbnail. In the present embodiment, Thumbnail Type IDs are determined for purposes of thumbnail as follows.

Thumbnail Type ID=1: head frame in a section
Thumbnail Type ID=2: middle frame in the section
Thumbnail Type ID=3: end frame in the section
Thumbnail Type ID=4: dynamic motion frame in the section
Thumbnail Type ID=5: gentle motion frame in the section
Thumbnail Type ID=6: object-appeared frame in the section
Thumbnail Type ID=7: object-disappeared frame in the section
Thumbnail Type ID=8: high image-quality frame in the section
Thumbnail Type ID=9: image not included in the section In this example, IDs are defined based on types of frames in the section. These IDs indicate selection bases of frames as originals of thumbnails.

Further, in "Thumbnail Offset", in FIG. 5, an offset to the thumbnail indicated by the index (the position of thumbnail corresponding to the index in the thumbnail area) is described.

Figures 6A, 6B:
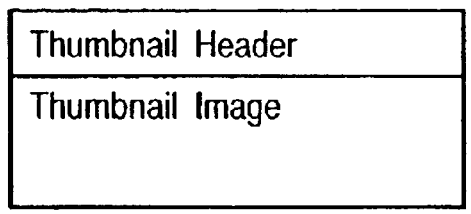
FIGS. 6A and 6B are tables showing examples of data structure of thumbnail 405 in a header 401 and one thumbnail in a thumbnail area 407 in the footer 403 in FIG. 4.

FIGS. 6A and 6B are tables showing examples of data structure of thumbnail 405 in the header 401 and 1 thumbnail in the thumbnail area 407 in the footer 403 in FIG. 4. In FIG. 6A, in "Thumbnail Header", management information of the thumbnail image or the like is described. Further, in "Thumbnail Image", the thumbnail image data itself is described. Further, FIG. 6B shows an example of data structure of the "Thumbnail Header" shown in FIG. 6A. In "Thumbnail Image Offset", an offset to the storage position of the thumbnail image (Thumbnail Image) is described. In "Thumbnail Image Size", the size of the thumbnail image is described. In "Thumbnail Key Relative Point", the frame position in the moving image as an original of the thumbnail is described as a relative position from the "Start Point".

Note that in case of the image not included in section, Thumbnail Type ID=9, as no image in the section is used, particular value such as a maximum value may be described.

<Thumbnail Registration Processing>

Figure 7:
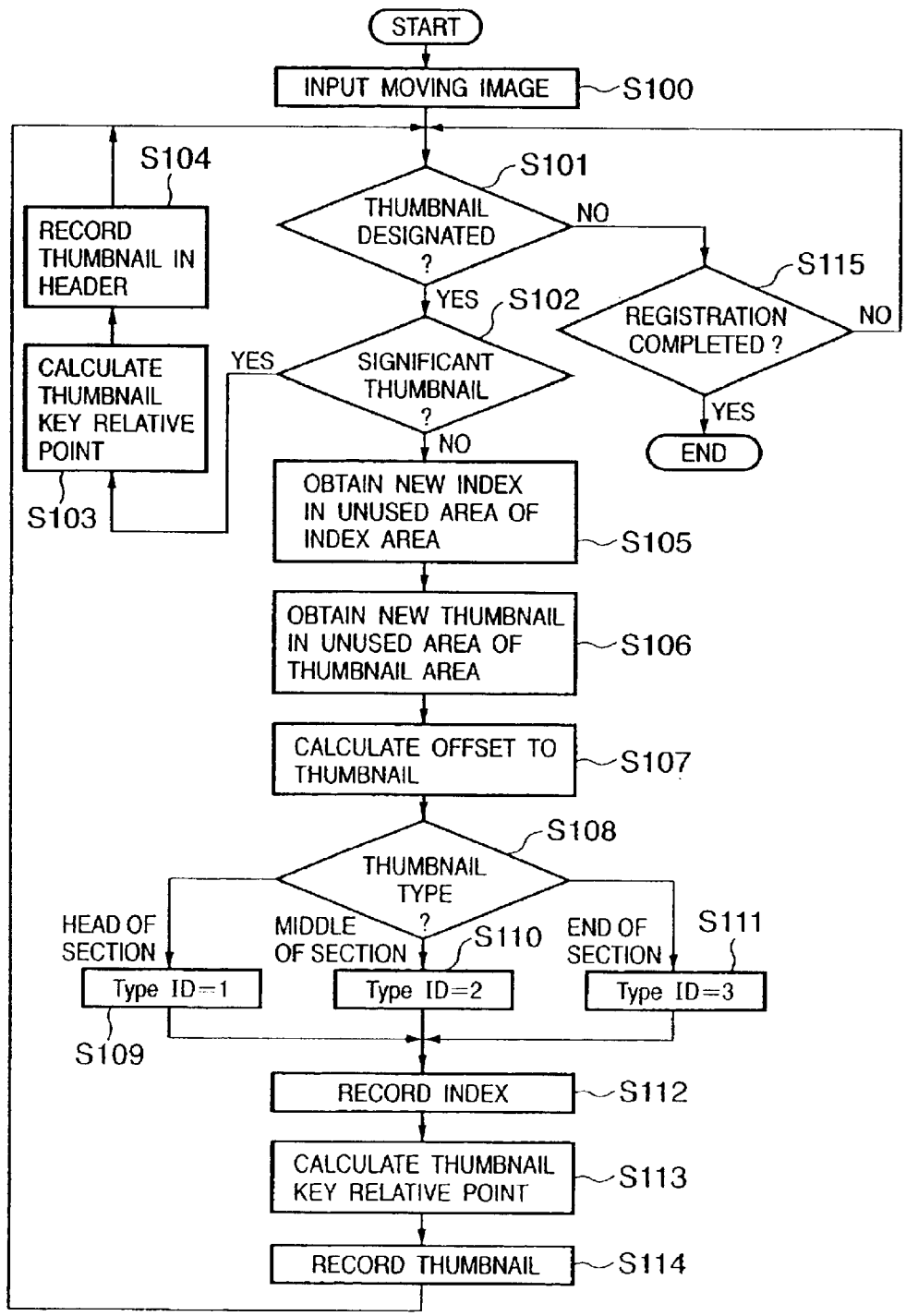
FIG. 7 is a flowchart showing an example of thumbnail registration operation according to the embodiment.

FIG. 7 is a flowchart showing an example of thumbnail registration operation according to the embodiment.

First, at step S100, the moving image input unit 301 inputs a moving image, and records it in the format of the moving image file as shown in FIG. 4 into the moving image file storage unit 302. At this time, an area for storing a thumbnail in the header 401 and an area for the footer 403 are ensured as reserved areas. Next, at step S101, it is determined whether or not thumbnail designation has been made by the user. The thumbnail designation means designation of arbitrary frame in a moving image as an original of thumbnail, a section in the moving image represented by the thumbnail, a selection base for selection of moving image frame as an original of the thumbnail, designation as to whether the thumbnail is significant or not, and the like. The selection base corresponds to the above-described Thumbnail Type ID in FIG. 5. Further, a significant thumbnail is a thumbnail which represents the moving image file and is registered as the thumbnail 405.

The thumbnail designation is made by the user by using functions of the apparatus. For example, in case where the user manually makes setups, (1) the user sets the apparatus to a predetermined mode for thumbnail designation, (2) then designates a desired section in the moving image, (3) then performs reproduction of the section, (4) and when an image from which the user wants to generate a thumbnail is displayed, the user inputs a predetermined instruction into the apparatus. In this case, the above Start Point and End Point are determined by the designated section in the moving image. Further, designation of desired section and image from which a thumbnail is to be generated are made by using the keyboard and/or mouse. Further, by inputting a selection base to be used at that time, the Thumbnail Type ID is determined.

Otherwise, it may be arranged such that a thumbnail is generated by automatically selecting an image from the section designated by the user based on the selection base designated by the user such as an image with dynamic change or an image with small change.

Further, it may be arranged such that a frame at the head/middle/end of the section is designated as a selection base, and if the "head" is designated, a head frame of the section is used, or if the "end" is designated, an end frame of the section is used, or if the "middle" is designated, a frame designated by the above procedure (1) to (4) is used, as a base image of the thumbnail.

As described above, the designation of moving image frame as an original of thumbnail can be made by various methods such as the user's designation and automatic designation by the apparatus. The present invention is applicable to any of the methods. However, in the flowchart of FIG. 7, a procedure using head, middle or end frame as a selection base is employed.

Next, at step S102, it is determined whether or not the designation that the thumbnail is significant has been made. As described above, in the present embodiment, the significant thumbnail means a thumbnail which represents the entire moving image file. If the designation of significant thumbnail has been made by the user, process proceeds to step S103, at which the frame position designated for the generation of thumbnail is corrected to a relative position from the head of the moving image file, to obtain the "Thumbnail Key Relative Point". Next, at step S104, a thumbnail 405, having the "Thumbnail Key Relative Point" calculated at step S103, the size of the thumbnail image (Thumbnail Image Size), and information on relative distance to the storage position of the thumbnail image (Thumbnail Image Offset) as a header, is recorded into the header 401. At this time, the header 401 may be stored in a position for comparatively quick and easy access on the storage medium, e.g., in use of optical disk, in an inner peripheral portion, thereby high-speed index display for moving image file selection can be realized. Then, the process returns to the determination at step S101. Note that as an important thumbnail is needed upon selection of moving image file in a later operation, it may be arranged such that the present process does not end before the registration of significant thumbnail is completed (the process does not branch to YES at step S115). In a case where no significant thumbnail is stored, it is apparent for persons skilled in the art that any one of thumbnails stored in the footer, e.g., an initially-stored thumbnail (the head of the footer) may be stored. In such case, it is not necessary to check the completion of registration of significant thumbnail upon completion of the above processing.

On the other hand, if it is determined at step S102 that the designation of significant thumbnail has not been made, the process proceeds to step S105. At step S105, a new index is ensured in an unused area of the index area 406 in the footer 403 in the moving image file 400. Next, at step S106, a new thumbnail is ensured in an unused area of the thumbnail area 407. Next, at step S107, an offset value to the thumbnail ensured at step S106 is calculated.

Next, at step S108, the type of designated thumbnail is determined based on the selection base (in this embodiment, whether the position of thumbnail base image is the head, middle or end of the section represented by the thumbnail) designated by the user.

The process branches to steps S109 to S111 in accordance with the type determined at step S108, and a corresponding Thumbnail Type ID is set. The setting of Thumbnail Type ID can be made by holding he above-described Thumbnail Type IDs in a table and referring to the table. In the present embodiment, if the selection base is the head frame in the section, setting is made as Thumbnail Type ID=1 (S109); if the selection base is the middle frame in the section, setting is made as Thumbnail Type ID=2 (S110); and if the selection base is the end frame in the section, setting is made as Thumbnail Type ID=3 (S111). In this embodiment, the number of Types is three, however, the invention is not limited to this number.

Next, at step S112, an index having the offset (Thumbnail Offset) calculated at step S107, the Thumbnail Type ID set at steps S108 to S111, and the Start Point and the End Point indicating the section designated by the user, is generated, and stored into the footer 403. At this time, the index area 406 of the footer 403 may be stored in a position for comparatively quick and easy access on the storage medium, e.g., in use of optical disk, in an inner peripheral portion, thereby high-speed selection of thumbnail in footer can be realized. Further, it is preferable that the index area 406 is recorded in a continuous area on the storage medium.

Next, at step S113, the position of the frame adopted as the thumbnail is corrected to a relative position from the header of the section, and the Thumbnail Key Relative Point is obtained. At step S114, a thumbnail generated by reducing the designated frame is stored, with the Thumbnail Key Relative Point calculated at step S113 and the image size of the thumbnail (Thumbnail Image Size) as a header, into the footer 403, and information on a relative distance to the storage position of the thumbnail image is stored in the Thumbnail Image Offset. At this time, the thumbnail area 407 of the footer 403 may be stored in a position for comparatively quick and easy access on the storage medium, e.g., in use of optical disk, in an inner peripheral portion, thereby high-speed display of thumbnail in footer can be realized. Next, the process returns to step S101, and if the designation of thumbnail is made again, the processing at steps S102 to S114 is repeated.

Further, if it is determined at step S101 that the designation of thumbnail has not been made, the process proceeds to step S115, at which if it is determined that termination of registration processing has been instructed, the process ends. If it is determined that the termination of registration processing has not been instructed, the process returns to step S101, to repeat the above processing.

By the above processing, any one of significant thumbnail, index and thumbnail image can be stored in a position for quick and easy access on the storage medium. Further, as thumbnails for different purposes, or thumbnails for different device features though the purpose is same can be discriminated by Thumbnail Type IDs, these thumbnails can be stored in the same file, thus management can be simplified.

<Thumbnail Utilization Processing>

Processing upon utilization of thumbnail registered by the above thumbnail registration processing will be described.

[Utilization by Browser]

Figure 8A:
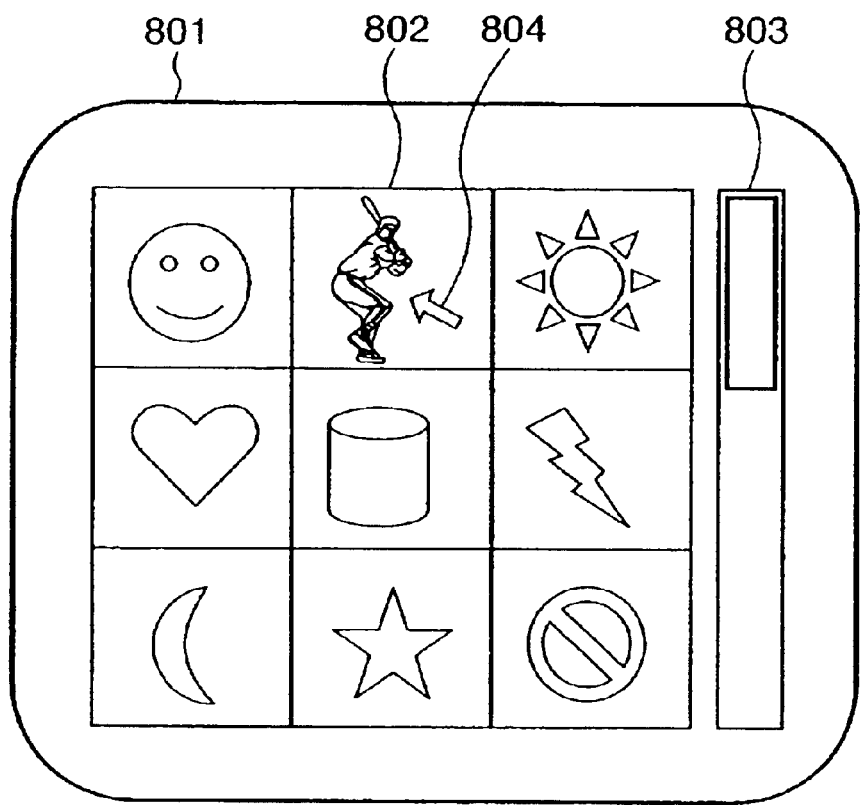
FIGS. 8A and 8B are examples of user interface upon execution of browser.
Figure 8B:
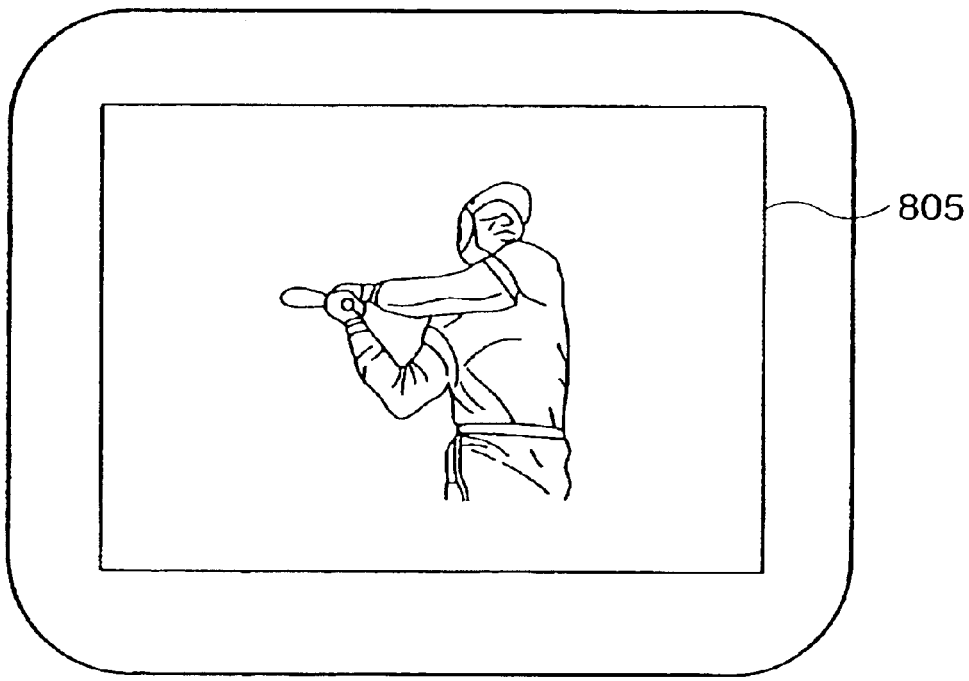

First, utilization of thumbnail in a browser will be described. FIGS. 8A and 8B are examples of user interface of a browser. FIG. 8A shows a display status when an image moving file to be browsed has been selected by a predetermined selection operation. Accordingly, the respective thumbnails in FIG. 8A are registered in the footer of the selected file. The predetermined selection operation means, e.g., displaying a list of thumbnails registered in the headers of the respective moving image files as significant thumbnails as shown in FIG. 8A, and selecting a moving image file by designating a desired thumbnail. In FIG. 8A, numeral 801 denotes an entire display area of the browser. Numeral 802 denotes an area where arrayed thumbnails are displayed. The thumbnails are displayed from the top line, from the left to the right. Numeral 803 denotes a scroll bar. In a case where the thumbnails cannot be displayed within the thumbnail display area 802 at once, they can be sequentially displayed by dragging in the scroll bar. Numeral 804 denotes a pointer. The user moves the pointer 804 by operation at the user operation unit 300, to designate a desired thumbnail in the thumbnail display area 802. When the thumbnail is selected by the pointer 804, the display screen image changes to a moving-image reproduction screen image 805 as shown in FIG. 8B, and moving image reproduction is started.

Figure 9A:
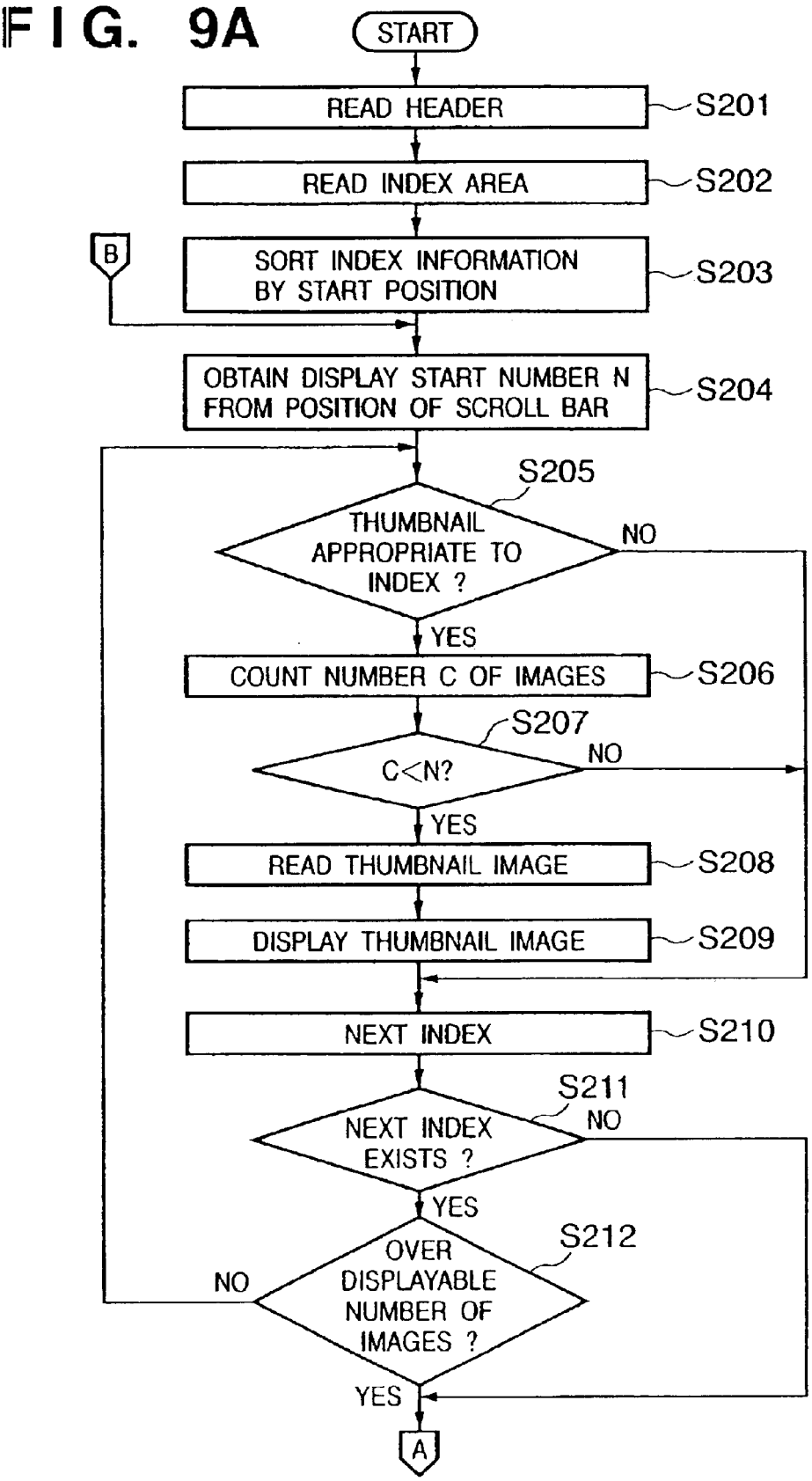

Hereinbelow, processing to realize the utilization of thumbnail in a browser will be described. FIGS. 9A and 9B are flowcharts showing processing upon browser operation in the moving image processing apparatus of the present embodiment. Note that the processing shown in FIGS. 9A and 9B is executed when browser processing is started in the moving image processing apparatus and a moving image file to be browsed is designated. Note that upon designation of moving image file to be browsed, the thumbnails representing the respective moving image files (thumbnails stored in the headers of the respective moving image files) are displayed in the thumbnail display area 802 in FIG. 8A. Then, a desired moving image file is selected by designating a desired thumbnail by the pointer 804. When the desired moving image file is selected, the processing shown in FIGS. 9A and 9B is started.

First, at step S201, the browse unit 304 reads the header 401 of the moving image file 400 selected by the above operation among the moving image files stored in the moving image file storage unit 302. Then the browse unit obtains various basic management information such as the file size from the moving image file management information 404, and stores the information into the memory (RAM 203). Next, at step S202, the unit reads the index area 406 in the footer 403 and stores it in the memory (RAM 203). Next, at step S203, the unit performs sorting on the indexes included in the index area 406 held at step S202 by start position (Start Point in FIG. 5) in ascending order, for display of thumbnails to be described later in time sequential order.

Next, at step S204, a thumbnail display start number N (indicating that the N-th thumbnail is at the left end of the top row) is obtained from the current bar position of the scroll bar 803. For example, if the scroll bar 803 is at an upper end (as shown in FIG. 8), display start number N=1 holds. Accordingly, display is started from the first thumbnail.

Next, by performing the following processing at steps S205 to S212 sequentially from the head index, thumbnails for browsing are displayed in the thumbnail display area 802 from the N-th thumbnail.

First, at step S205, it is checked whether or not the thumbnail is appropriate to browsing based on the selection base upon registration of thumbnail. Even in the same usage of browsing, the base of thumbnail as an appropriate index in browsing operation may differ in accordance with device. In the present embodiment, the browse unit 304 determines that the head frame in the section is appropriate as an index thumbnail. To check whether or not it is a head frame in the section, it is checked whether Thumbnail Type ID=1 holds. Note that upon start of processing, checking is started from the head after the sorting.

If it is determined at step S205 that it is a thumbnail for browser, the process proceeds to step S206. At step S206, the number C (the order in the thumbnails for browser) is counted. At step S207, it is checked whether or not the counted number C is less than the display start number N (C<N). This processing is made for skipping thumbnails before the number N without display.

If the number C is equal to or greater than the display start number N, the thumbnail image is read for thumbnail display at step S208. Next, at step S209, the thumbnail image is displayed in the thumbnail display area 802, and the process proceeds to step S210. On the other hand, if it is determined at step S205 that the thumbnail is not for browsing, or if it is determined at step S207 that the number C is less than the number N, the process proceeds to step S210.

At step S210, the processing subject is moved to the next index to process the next thumbnail. In a case where the immediately previous processing has been performed on the last index and there is no next index, the process proceeds to step S213. If the next index exists, the process proceeds to step S212, at which it is checked whether or not the number has exceeded the number of displayable thumbnails in the thumbnail display area 802. For example, in the example in FIG. 8A, the number of displayable thumbnails is 9. Accordingly, if C≧N+9 holds, it is determined that displayable thumbnails have been displayed.

If the number is not over the number of displayable thumbnails, the process returns to step S205. That is, the processing at steps S205 to S210 is performed to sequentially check the indexes until there is no index to be processed or the number exceeds the number of displayable thumbnails.

If there is no index to be processed or the number of exceeds the number of displayable thumbnails in the thumbnail display area 802, the process proceeds to step S213. At step S213, it is checked whether or not the scroll bar has been operated by the user. If it has been operated, the processing at steps S204 to S212 is repeated, thereby a thumbnail corresponding to the position of the operated scroll bar is displayed. If the scroll bar has not been operated, the process proceeds to step S214.

Next, at step S214, it is determined whether or not one of the thumbnails displayed in the thumbnail display area 802 has been selected by the user. If a thumbnail has been selected, the process proceeds to step S215, at which the Start Point is read from the index corresponding to the selected thumbnail. Next, at step S216, moving image reproduction is started from the Start Point, and the moving image is displayed in the moving image reproduction screen image 805. Thereafter, the process proceeds to step S217. On the other hand, if it is determined at step S214 that a thumbnail has not been selected, the process proceeds to step S217.

At step S217, it is determined whether or not termination of browsing by the browse unit 304 has been instructed. If it is determined that termination has not been instructed, the process returns to step S213. If it is determined that termination has been instructed, the process ends.

Note that in the above example, when a thumbnail is selected, the Start Point is obtained from the corresponding index and reproduction is started from the position and continued by the end of the moving image data. However, the reproduction is not limited to this arrangement. It may be arranged such that the Start Point and the End Point are obtained from the index corresponding to the selected thumbnail and only the section is reproduced. Note that a stop or pause button may be provided such that moving image reproduction can be stopped in an arbitrary position.

In the above description, browsing is made in one moving image file for the sake of simplicity of explanation, however, even in thumbnail selection in plural moving image files, the selection can be made by repeating the processing to display a thumbnail for the respective moving image files.

By the above processing, the browse unit 304 reads only thumbnail(s) for browsing from the thumbnail area 407 and utilizes it. That is, the apparatus or processing utilizing thumbnails can select a thumbnail appropriate to the processing by the information upon generation of thumbnail (Thumbnail Type ID), thereby can utilize the thumbnail.

[Utilization by Moving Image Editing]

Figure 10:
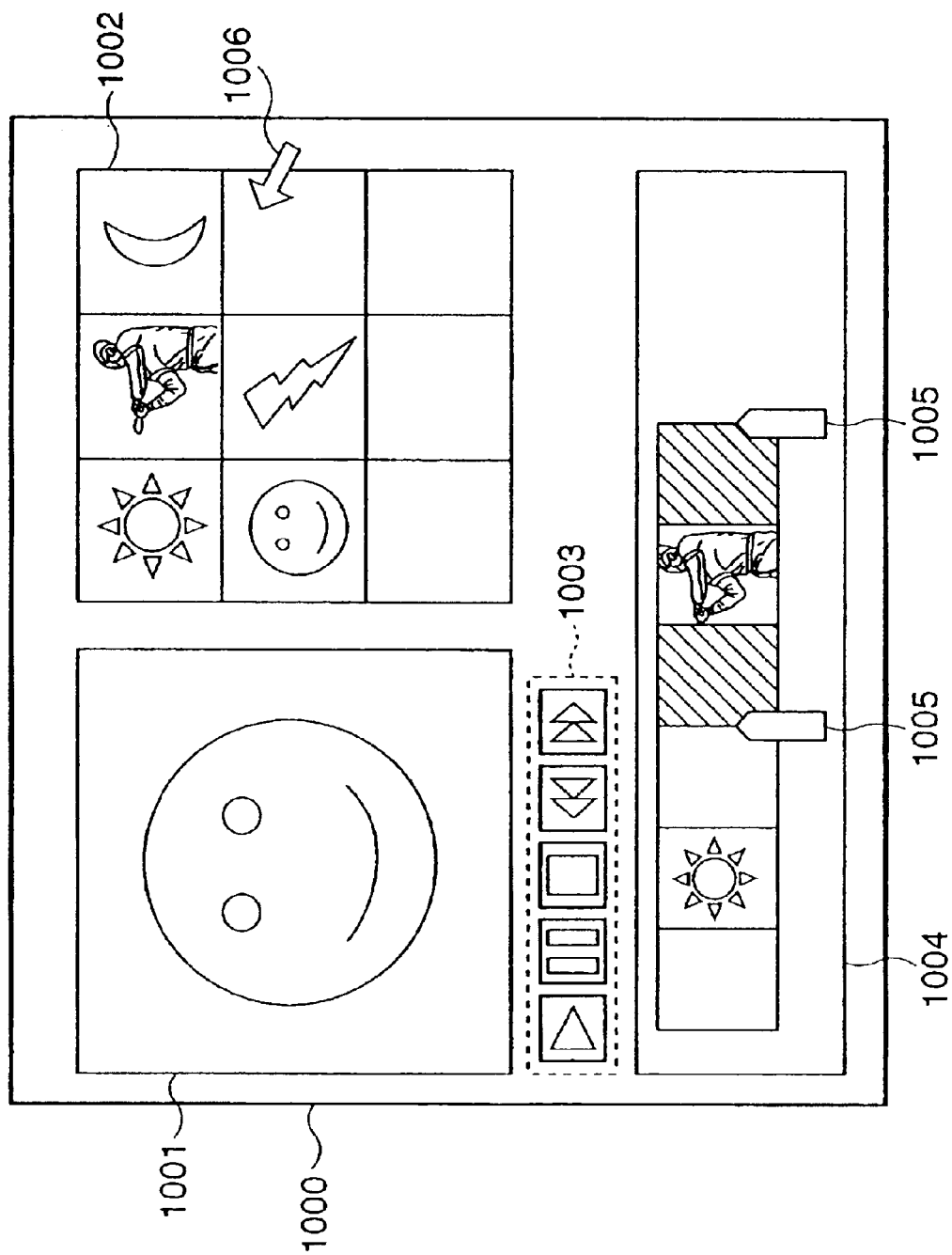
FIG. 10 is an example of the user interface upon moving image editing by an editing unit 305.

Next, utilization of thumbnail in moving image editing will be described. FIG. 10 is an example of the user interface upon moving image editing by an editing unit 305. Numeral 1000 denotes an editing operation window in which an editing operation is performed. Numeral 1001 denotes a reproduction window in which a selected moving image file or the result of editing is reproduced for checking. Numeral 1002 denotes a moving image file window for display of a list of thumbnails (significant thumbnails) in the headers of the respective moving image files. Numeral 1003 denotes operation buttons for operation of moving image reproduced in the reproduction window 1001, for "reproduction, temporary stoppage, stoppage, reverse and fast-forward" operations from the left.

Numeral 1004 denotes a scene designation window in which selected moving image files are arrayed for designation of section in the respective moving images. Note that thumbnail images are overlay-displayed in the respective moving image file areas for the user's recognition. In the figure, files represented by thumbnails of "sun" and "baseball player" are arrayed. Numeral 1005 denotes a scene designation bar. The start point and the end point of selected clip (hatched portion) can be designated by operating the scene designation bar.

Numeral 1006 denotes a pointer. The user moves the pointer 1006 by operating the user operation unit 300, to designate selection of various buttons and designation of operation. In an operation procedure, a moving image files are selected from the moving image file window 1002 and dragged and dropped into the scene designation window 1004 in the order of reproduction. Then, the start point and the end point are corrected by using the scene designation bar 1005. At this time, the user performs moving image reproduction in the reproduction window 1001 by operating the operation unit 1003 in accordance with necessity thereby checks the image.

Figure 11:
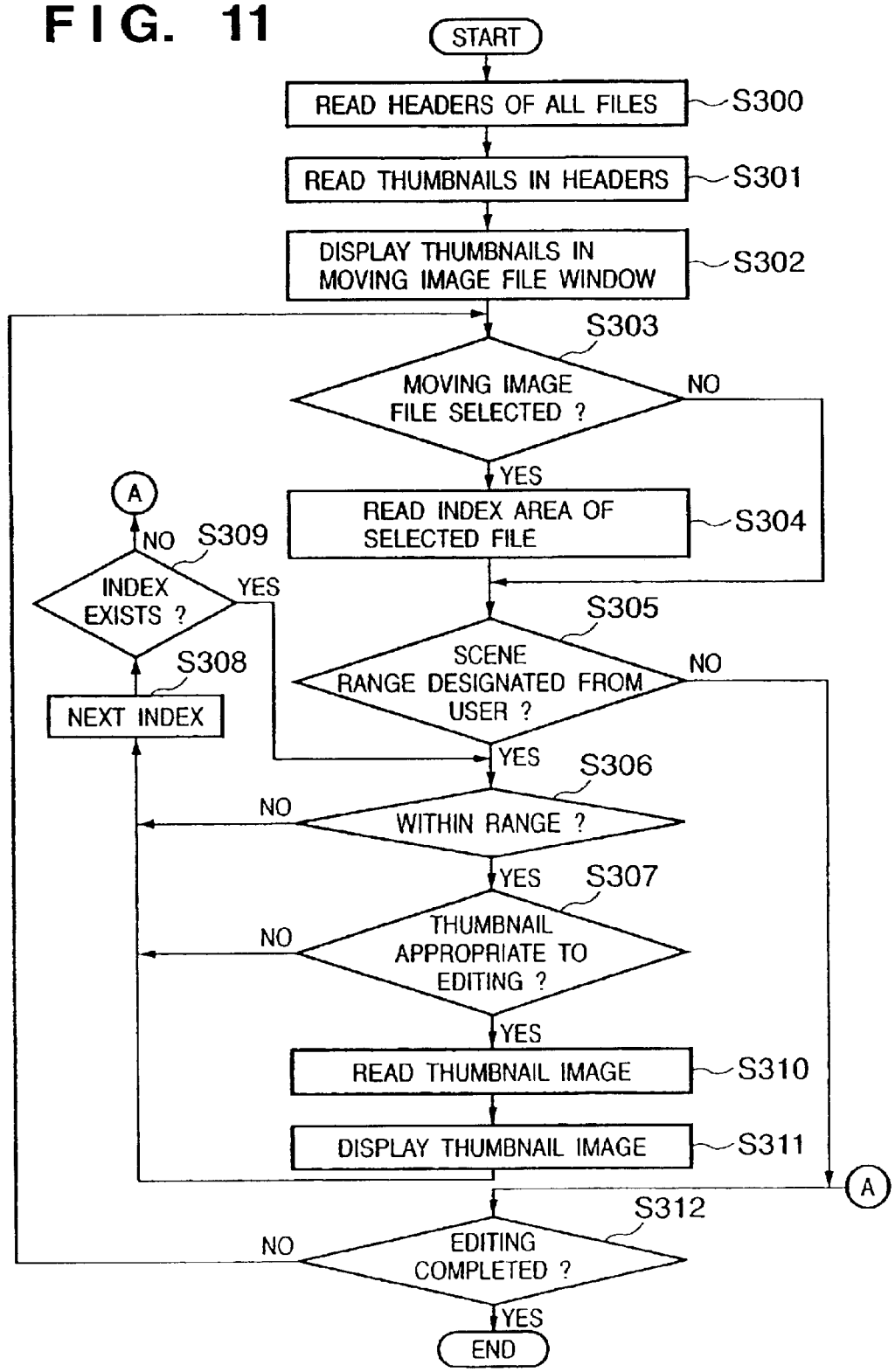
FIG. 11 is a flowchart showing a thumbnail display operation upon the moving image editing by the editing unit 305.

FIG. 11 is a flowchart showing a thumbnail display operation upon the moving image editing by the editing unit 305. Note that the processing in FIG. 11 is started when moving image editing processing is executed in the moving image processing apparatus.

First, at step S300, the editing unit 305 reads the headers 401 of all the moving image files from the moving image file storage unit 302. Next, at step S301, the editing unit reads the thumbnails 405 in the header 401 of the respective files. Then at step S302, the editing unit displays the thumbnails in the headers (i.e. significant thumbnails) as representative images of the respective moving image files in the moving image file window 1002.

Next, at step S303, it is determined whether or not a moving image file has been selected. In the present embodiment, it is determined whether or not the moving image file(s) has been dragged and dropped from the moving image file window 1002 to the scene designation window 1004 by operation of the pointer 1006. If moving file(s) has been selected, the process proceeds to step S304, at which the index area 406 is read from the footer in the moving image file selected by the user. On the other hand, if it is determined at step S303 that moving image file selection has not been made, step S304 is skipped.

Next, at step S305, it is checked whether or not the user has designated a range of scene regarding the moving image file by the scene designation bar 1005 in the scene designation window 1004. If the range designation has been made, thumbnail(s) for editing existing within the range designated by the user is extracted and displayed at steps S306 to S311.

First, at step S306, the Start Point and the End Point in the index (upon start of processing, the head index) are referred to, and it is determined whether or not a section indicated by the Start Point and the End Point is within the range designated by the user. If it is within the range, the process proceeds to step S307, at which it is determined whether or not the thumbnail corresponding to the index is a thumbnail appropriate to editing based on the selection base of the thumbnail. Even in the same usage of editing, the base of thumbnail appropriate index in editing may differ in accordance with device. The editing unit 305 of the present embodiment determines a middle frame in the section as a thumbnail appropriate to editing. To check whether or not it is a middle frame in the section, it is checked whether Thumbnail Type ID=2 holds. If it is a thumbnail appropriate to editing, the process proceeds to step S310.

On the other hand, if it is determined at step S306 that the section corresponding to the index is not within the range designated by the user, or if it is determined at step S307 that the thumbnail is not for editing, the process proceeds to step S308 to process the next index. At step S309, it is determined whether or not the next index exists. If the next index exists, the processing at steps S306 and S307 is repeated.

If the condition at step S307 is satisfied, the process proceeds to step S310, at which a thumbnail image corresponding to the index is read. Then at step S311, the thumbnail image is displayed. For example, as shown in FIG. 10, in the scene designation window 1004, the thumbnail image is overlay-displayed on a bar indicating the scene. By this display, the user can easily recognize the scene in the designated range. Thereafter, the process proceeds to step S308, to repeat the above-described processing on the next index.

By the above processing, thumbnails for editing in all the sections within the range designated by the user are overlay-displayed on the bars indicating the scenes. Note that the display range of thumbnail is an area designated by 2 scene designation bars 1005. If the size of area between the designation bars is insufficient, a part of the thumbnail may be overlaid or a scroll bar may be displayed for scrollable display.

If it is determined at step S305 that a scene range has not been designated by the user, or if it is determined at step S309 that there is no index to be processed, the process proceeds to step S312. At step S312, it is determined whether or not termination of the moving image editing operation has been instructed. If the termination of the editing operation has not been instructed (the moving image editing is performed), the process returns to step S303 to repeat the above processing. On the other hand, if it is determined that the termination of the editing operation has been instructed, the process ends.

By the above processing, upon file selection, the editing unit 305 can use a significant thumbnail stored in the header, and utilize only thumbnails for moving image editing corresponding to the designated range from the thumbnail area 407.

Note that in the above embodiment, the browsing and moving image editing have been described as utilization of thumbnail images, however, the usage is not limited to these 2 operations, but thumbnail images can be used for various purposes such as printing of frame image corresponding to a selected thumbnail.

For example, if a frame image corresponding to a selected thumbnail is printed, thumbnails appropriate to printing are extracted from thumbnails corresponding to designated image data (thumbnails recorded in the footer) and displayed as printing frame candidates, and a frame as an original of the selected thumbnail is printed. Even in the same usage of printing, the base of thumbnail appropriate to printing may differ in accordance with device. For example, if a gentle motion frame and a high-image-quality frame in the section are handled as frames appropriate to printing, it is checked whether Thumbnail Type ID=5 or Thumbnail Type ID=8 holds. When a frame is designated, an image of the frame specified by the Thumbnail Key Relative point shown in FIG. 6 of the designated thumbnail is obtained and is printed. Accordingly, another function such as a printing unit may be added to the moving image processing apparatus in FIG. 3.

Note that in the above embodiment, the browsing unit and the editing unit are provided as functions for utilizing thumbnails, however, only one of these functions including the above printing unit, or other plural functions may be used.

Note that in the above embodiment, the moving image processing apparatus shown in FIG. 3 is a single apparatus including the moving image input unit 301, the thumbnail generation unit 303, the browse unit 304, and the editing unit 305. However, the moving image processing apparatus may be constructed as plural apparatuses of respective functions, including the other unit such as the above-described printing unit, or apparatuses having combinations of several functions. In such case, a moving image file 400 (FIG. 4) including thumbnails may be transmitted among the respective apparatuses via a storage medium or communication means such as IEEE 1394.

Note that in the above embodiment, since there is no index for the header thumbnails, the header thumbnails do not have the Start Point, the End Point and the Thumbnail Type ID, however, these information may be held as management information.

Note that in the above embodiment, the thumbnail recorded in the header (thumbnail representing the file) is not recorded in the footer, but the thumbnail may be recorded in the header and the footer.

Note that in a case where thumbnails generated from plural selection bases are the same (for example, a middle frame and a dynamic motion frame in the section are the same), the thumbnails may be registered with different Thumbnail Type IDs, or one Thumbnail Type ID (e.g. Thumbnail Type ID=10: middle and dynamic motion frame in section) may be prepared. In the latter case, as it is not necessary to register the thumbnails which are the same, the efficiency of data use can be improved. Note that it may be arranged such that plural selection bases (Thumbnail Type IDs) can be registered for one thumbnail.

Figure 12:
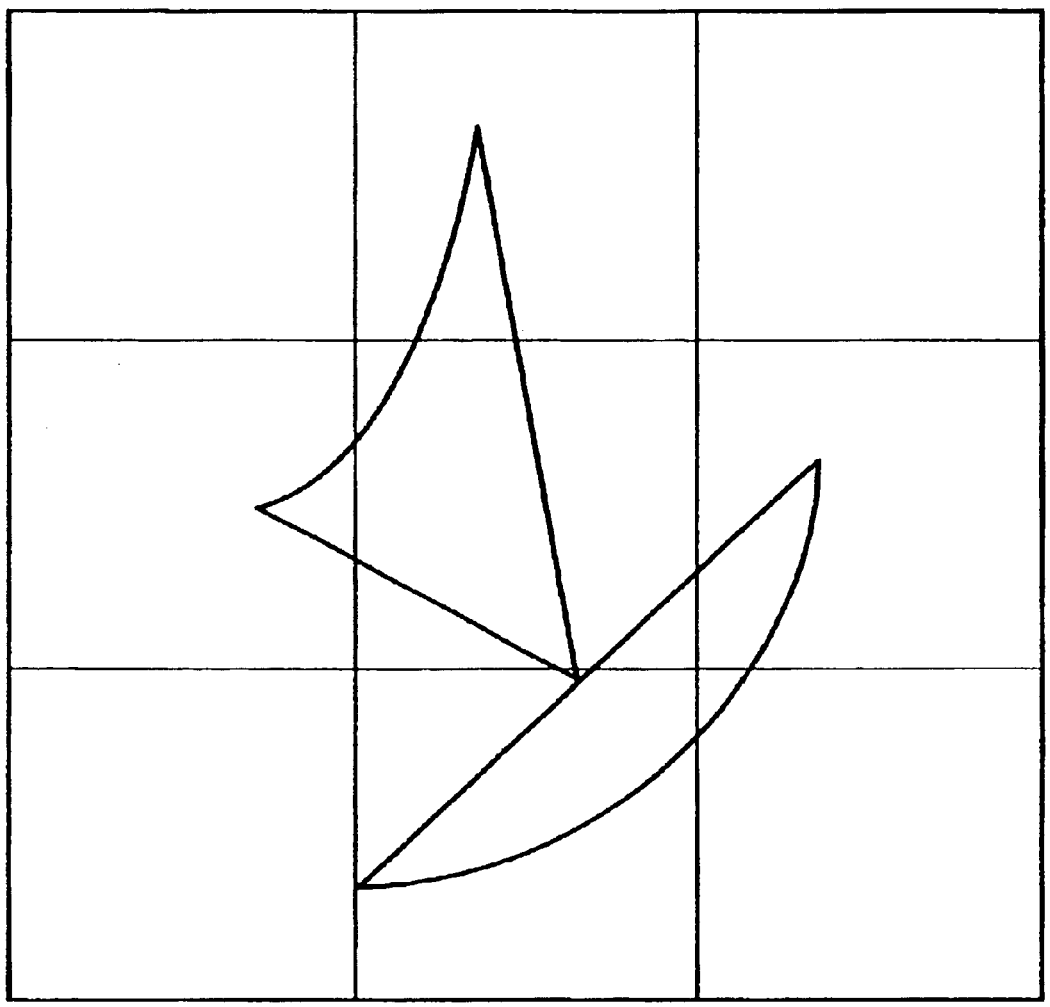
FIG. 12 is an example of division of frame into blocks.

Note that in the above embodiment, the registration of thumbnail is determined by the user's instruction, however, it may be automated. For example, to automatically extract a dynamic motion frame in a section, a current frame and a previous frame are divided into plural blocks in vertical and horizontal directions as shown in FIG. 12. In each block, RGB mean values are calculated, and the sum of squares of the differences in respective RGB channels is obtained between the current and previous frames as an inter-frame similarity distance. An example of the expression is as follows.

$$\sum_{i=1}^{k} \{(P1_{iR} - P2_{iR})^2 + (P1_{iG} - P2_{iG})^2 + (P1_{iB} - P2_{iB})^2\} \quad \text{[Expression 1]}$$

i: block being processed
K: the number of divided blocks
$P1_{iR}$: R channel mean value in i-th block of previous frame
$P1_{iG}$: G channel mean value in i-th block of previous frame
$P1_{iB}$: B channel mean value in i-th block of previous frame
$P2_{iR}$: R channel mean value in i-th block of current frame
$P2_{iG}$: G channel mean value in i-th block of current frame
$P2_{iB}$: B channel mean value in i-th block of current frame The frames are similar as the inter-frame similarity distance is small, while the frames are not similar as the distance is large. As a motion is dynamic, similarity between the frames reduces, a frame having an inter-frame similarity distance equal to or greater than a threshold value may be determined as a dynamic motion frame.

As described above, according to the present embodiment, as plural thumbnails corresponding to plural purposes and selection bases can be stored as one file, the thumbnails can be easily managed. Further, upon use of thumbnail, only a thumbnail corresponding to the purpose and a device feature to utilize the thumbnail can be used by referring to the selection base (Thumbnail Type ID) upon generation of thumbnail added to the thumbnail.

Further, the object of the present invention can be also achieved by providing a storage medium holding software program code for realizing the functions of the above-described embodiment to a system or an apparatus, and reading and executing the program code stored in the storage medium by a computer (e.g., CPU, MPU) of the system or apparatus.

In this case, the program code read from the storage medium itself realizes the functions according to the embodiment, and the storage medium constitutes the invention.

Further, the storage medium, such as a floppy disk, a hard disk, an optical disk, a magneto-optical disk, a CD-ROM, a CD-R, a DVD, a magnetic tape, a non-volatile type memory card, and a ROM can be used for providing the program code.

Furthermore, besides aforesaid functions according to the above embodiment are realized by executing the program code by the computer, the present invention includes a case where an OS (operating system) or the like working on the computer performs a part or entire actual processing in accordance with designations of the program code and realizes the functions according to the above embodiment.

Furthermore, the present invention also includes a case where, after the program code read from the storage medium is written in a function expansion board which is inserted into the computer or in a memory provided in a function expansion unit which is connected to the computer, a CPU or the like contained in the function expansion board or unit performs a part or entire actual processing in accordance with designations of the program code and realizes the functions of the above embodiment.

As described above, according to the present invention, operability of various moving image processing using a representative image is improved by adding information regarding generation of representative image as its attribute to the representative image, and management of representative images can be simplified.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for managing one or plural representative images in correspondence with a moving image, comprising:
   a unit configured to store a representative image, generated based on a frame image selected from the moving image, in correspondence with the moving image;

a unit configured to store section information indicating a section in the moving image and attribute information indicating a selection base of the frame image, in correspondence with the representative image;

a unit configured to store position information indicating a position of the frame image in correspondence with the representative image;

a first designation unit configured to designate a desired section in a moving image; and a generation unit configured to generate a representative image corresponding to the section based on a frame image selected in accordance with the selection base from a moving image in the section designated by said first designation unit, generate section information indicating the section in the moving image, generate position information indicating the position of the selected frame image in the moving image, and generate attribute information indicating the designated selection base.

2. The apparatus according to claim 1, wherein the representative image is a thumbnail obtained by reducing the frame image.

3. The apparatus according to claim 1, further comprising a second designation unit configured to designate one of plural selection bases, wherein said generation unit generates the representative image based on a frame image selected in accordance with the selection base designated by said second designation unit.

4. The apparatus according to claim 3, wherein the plural selection bases include a head frame image in the designated section, an end frame image in the section and a desired frame image in the section other than the head and end frame images.

5. The apparatus according to claim 3, wherein the attribute information is an identification number allotted to each of the plural selection bases.

6. An apparatus for managing one or plural representative images in correspondence with a moving image, comprising:

a unit configured to store a representative image, generated based on a frame image selected from the moving image, in correspondence with the moving image;

a unit configured to store section information indicating a section in the moving image and attribute information indicating a selection base of the frame image, in correspondence with the representative image;

a selection unit configured to select a representative image corresponding to a processing purpose from representative images stored in correspondence with a desired moving image based on the attribute information;

an application unit configured to, if one of the representative images selected by said selection unit is designated, apply processing corresponding to the processing purpose for a moving image in a section indicated by the section information corresponding to the designated representative image, wherein upon printing operation of printing a desired frame image in a moving image, said selection unit selects a representative image appropriate to printing by referring to the attribute information, and wherein if one of the representative images selected by said selection unit is designated, said application unit generates and outputs print data so as to print-output a frame image indicated by the position information corresponding to the designated representative image.

7. A method for managing one or plural representative images in correspondence with a moving image, comprising:

a step of storing a representative image, generated based on a frame image selected from the moving image, in correspondence with the moving image;

a step of storing section information indicating a section in the moving image and attribute information indicating a selection base of the frame image, in correspondence with the representative image;

a step of storing position information indicating a position of the frame image in correspondence with the representative image;

a first designation step of designating a desired section in a moving image; and a generation step of generating a representative image corresponding to the section based on a frame image selected in accordance with the selection base from a moving image in the section designated by said first designation means, generating section information indicating said section in the moving image, generating position information indicating the position of the selected frame image in said moving image, and generating attribute information indicating the designated selection base.

8. The method according to claim 7, wherein the representative image is a thumbnail obtained by reducing the frame image.

9. The method according to claim 7, further comprising a second designation step of designating one of plural selection bases, wherein at said generation step, the representative image is generated based on a frame image selected in accordance with the selection base designated in said second designation step.

10. The method according to claim 9, wherein the plural selection bases include a head frame image in the designated section, an end frame image in the section and a desired frame image in the section other than the head and end frame images.

11. The method according to claim 9, wherein the attribute information is an identification number allotted to each of the plural selection bases.

12. A method for managing one or plural representative images in correspondence with a moving image, comprising:

a step of storing a representative image, generated based on a frame image selected from the moving image, in correspondence with the moving image;

a step of storing section information indicating a section in the moving image and attribute information indicating a selection base of the frame image, in correspondence with the representative image;

a selection step of selecting a representative image corresponding to a processing purpose from representative images stored in correspondence with a desired moving image based on the attribute information;

an application step of, if one of representative images selected at said selection step is designated, applying processing corresponding to the processing purpose for a moving image in a section indicated by the section information corresponding to the designated representative image, wherein upon printing operation of printing a desired frame image in a moving image, a representative image appropriate to printing is selected by referring to the attribute information in said selection step, and wherein if one of the representative images selected at said selection step is designated, print data is generated and output at said application step so as to print-output a frame image indicated by the position information corresponding to the designated representative image.

* * * * *

UNITED STATES PATENT AND TRADEMARK OFFICE
CERTIFICATE OF CORRECTION

PATENT NO.    : 6,965,701 B2
DATED         : November 15, 2005
INVENTOR(S)   : Hiroshi Tojo It is certified that error appears in the above-identified patent and that said Letters Patent is hereby corrected as shown below:

Title page,
Item [57], ABSTRACT,
Line 4, "imaged" should read -- image --.

Drawings,
Sheet 4, Figure 4, "MANEGEMENT" should read -- MANAGEMENT --.
Sheet 6, Figure 6, "Imege" should read -- Image --.

Column 1,
Line 6, "Dec. 10,2002" should read -- Dec. 10, 2002 --.
Line 56, "for e.g." should read -- for, e.g., --.

Column 2,
Line 21, "of representative" should read -- of a representative --.
Line 26, "has its" should read -- has as its --.
Line 28, "to simplifying" should read -- simplifying --.
Line 67, "representative" should read -- a representative --.

Column 3,
Line 58, "file)." should read -- file.) --.

Column 4,
Line 21, "e.g." should read -- e.g., --.

Column 6,
Line 17, "particular" should read -- a particular --.
Line 48, "of desired" should read -- of a desired --.

Column 8,
Line 18, "of optical" should read -- of an optical --.

Column 11,
Line 31, "necessity thereby" should read -- necessity and thereby --.
Line 43, "i.e." should read -- i.e., --.

Column 12,
Line 24, "window 1004,the" should read -- window 1004, the --.

UNITED STATES PATENT AND TRADEMARK OFFICE
CERTIFICATE OF CORRECTION

PATENT NO. : 6,965,701 B2
DATED : November 15, 2005
INVENTOR(S) : Hiroshi Tojo

It is certified that error appears in the above-identified patent and that said Letters Patent is hereby corrected as shown below:

Column 13,
Line 40, "e.g." should read -- e.g., --.

Column 15,
Line 58, "upon printing" should read -- upon a printing --.

Column 16,
Line 66, "upon printing" should read -- upon a printing --.

Signed and Sealed this

Second Day of May, 2006

JON W. DUDAS
*Director of the United States Patent and Trademark Office*